United States Patent
Morikawa et al.

(10) Patent No.: US 10,620,303 B2
(45) Date of Patent: Apr. 14, 2020

(54) DISTANCE MEASUREMENT DEVICE, DISTANCE MEASUREMENT SYSTEM AND DISTANCE MEASUREMENT METHOD

(71) Applicant: FUJITSU LIMITED, Kawasaki-shi, Kanagawa (JP)

(72) Inventors: Takeshi Morikawa, Yokohama (JP); Koichi Tezuka, Kobe (JP); Jun Kawai, Kawasaki (JP); Koichi Iida, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 15/715,230

(22) Filed: Sep. 26, 2017

(65) Prior Publication Data

US 2018/0100917 A1    Apr. 12, 2018

(30) Foreign Application Priority Data

Oct. 7, 2016   (JP) .................. 2016-199299

(51) Int. Cl.
| | |
|---|---|
| G01S 7/4911 | (2020.01) |
| G01S 17/42 | (2006.01) |
| G01S 7/487 | (2006.01) |
| G01S 17/87 | (2020.01) |
| G01S 7/4915 | (2020.01) |
| G01S 17/32 | (2020.01) |

(52) U.S. Cl.
CPC ............ *G01S 7/4911* (2013.01); *G01S 7/487* (2013.01); *G01S 7/4915* (2013.01); *G01S 17/32* (2013.01); *G01S 17/42* (2013.01); *G01S 17/87* (2013.01)

(58) Field of Classification Search
CPC ...... G01S 7/4911; G01S 7/4915; G01S 7/487; G01S 17/87; G01S 17/66; G01S 17/48; G01S 17/42; G01S 17/32; G01S 17/08; G01C 3/00; G01C 5/00
See application file for complete search history.

(56) References Cited

U.S. PATENT DOCUMENTS

2016/0252619 A1*  9/2016  Markendorf .......... G01S 17/023
                                                                356/3.01

FOREIGN PATENT DOCUMENTS

| JP | 05-157540 | 6/1993 |
|---|---|---|
| JP | 2011-112503 | 6/2011 |

* cited by examiner

*Primary Examiner* — Toan M Le
(74) *Attorney, Agent, or Firm* — Fujitsu Patent Center

(57) ABSTRACT

A distance measurement device controls an emission direction of a laser beam in a light projection device and a reception direction of a laser beam in a light reception device, obtains a reception intensity of the laser beam received by the light reception device, determines whether or not the laser beam received by the light reception device is a laser beam reflected by a target of distance measurement on the basis of a reception direction of the laser beam, a period of time between when the light projection device emits the laser beam and when the light reception device receives the laser beam, a reception intensity of the laser beam, and determination information, and calculates a distance to the target in a case when the laser beam received by the light reception device is the laser beam reflected by the target.

5 Claims, 11 Drawing Sheets

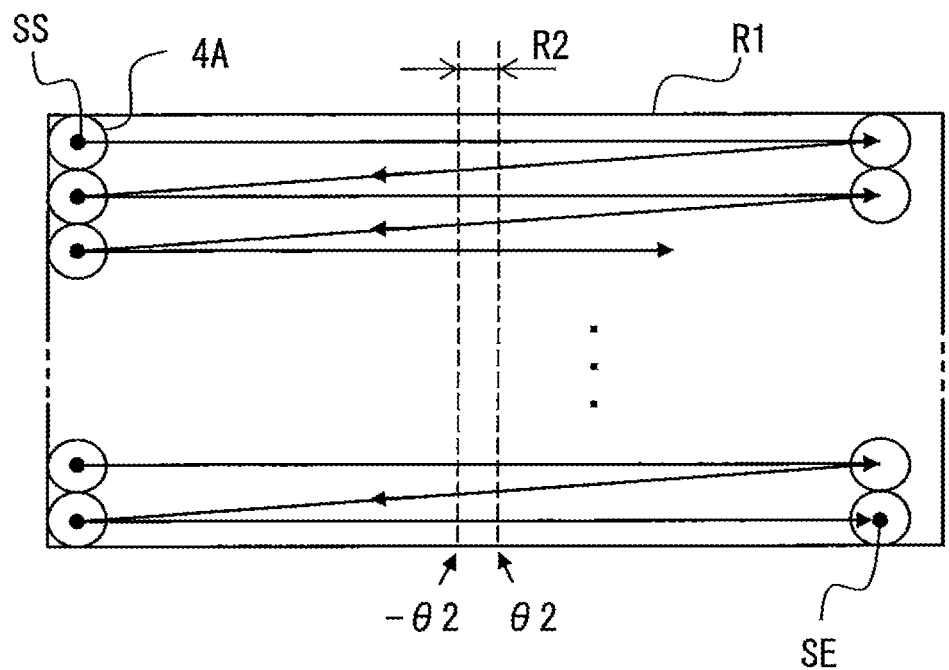
F I G. 4A
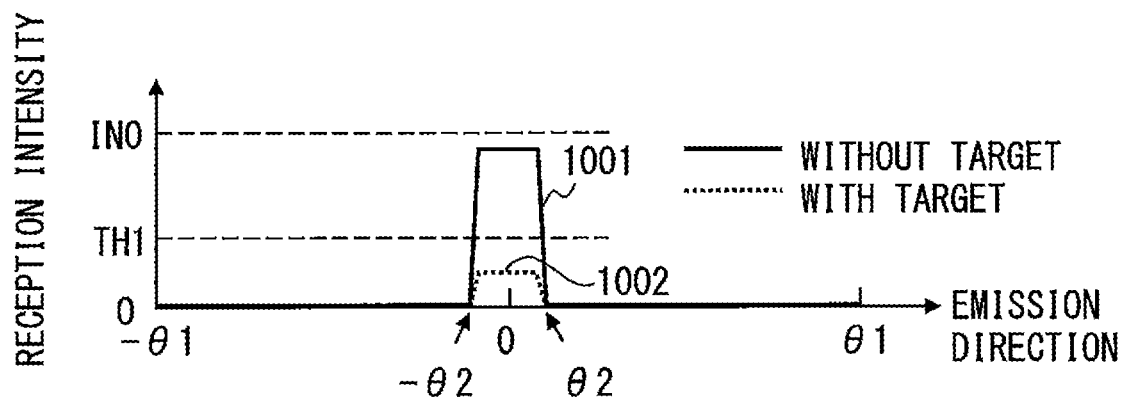
F I G. 4B
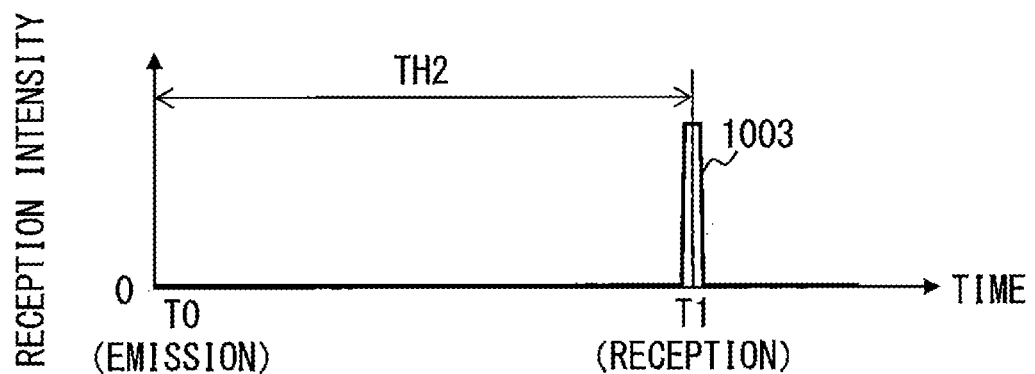
F I G. 4C

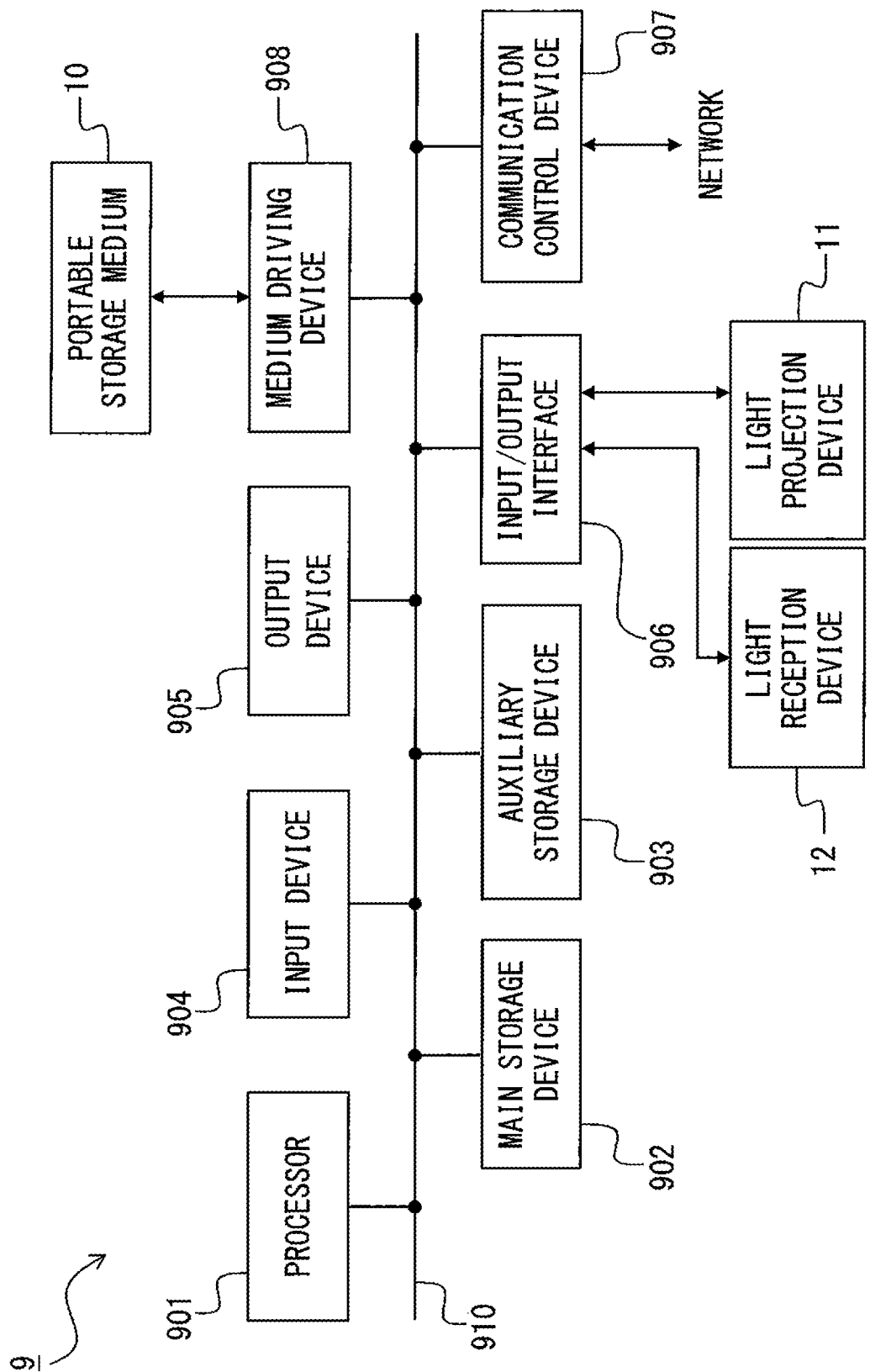

DISTANCE MEASUREMENT DEVICE, DISTANCE MEASUREMENT SYSTEM AND DISTANCE MEASUREMENT METHOD

CROSS-REFERENCE TO RELATED APPLICATION

This application is based upon and claims the benefit of priority of the prior Japanese Patent Application No. 2016-199299, filed on Oct. 7, 2016, the entire contents of which are incorporated herein by reference.

FIELD

The embodiments discussed herein are related to a distance measurement device, a distance measurement system and a distance measurement method.

BACKGROUND

Laser distance measurement devices, which measure the distance to a target by using a laser beam, are used for detecting obstructions for the purposes of for example driver assistance, parking assistance, etc. for automobiles etc. Also, laser distance measurement devices are used for surrounding monitoring such as object detection etc. existing between vehicles and doors at platforms of railroads. Further, laser distance measurement devices are sometimes used for scoring in competitions such as artistic gymnastics etc.

As a method of measuring the distance to a target by using a laser distance measurement device, there is a method in which two laser distance measurement devices are arranged face to face with the target between them so as to measure the distances to the target. According to this measurement method, while a first laser distance measurement device is measuring the distance to the target, the second laser distance measurement device can simultaneously measure the distance on the back side of the target, which the first laser distance measurement device is not allowed to measure.

However, when two laser distance measurement devices are arranged face to face so as to measure the distances to a target, a laser beam emitted from one of the laser distance measurement devices is sometimes received by the other laser distance measurement device. In such a case, the other laser distance measurement device falsely calculates the distance to a target that does not actually exist. As a technique for suppressing such false detection of targets, a method is known in which the rotation speed of a rotation mirror is adjusted on the basis of the rotation angle of the rotation mirror that controls the emission timing of a laser beam in each of the two laser distance measurement devices (see Document 1 for example). In this technique, one of the laser distance measurement devices determines the presence or absence of a possibility of false detection of a target on the basis of information representing a relationship between the rotation angle of the rotation mirror of the device itself, the rotation angle of the rotation mirror of the other laser distance measurement device, and the rotation angle at which the target is falsely detected. Also, when there is a possibility that a target will be detected falsely, the laser distance measurement device adjusts the rotation speed of the rotation mirror so as to reduce the possibility of false detection of the target.

Document 1: Japanese Laid-open Patent Publication No. 2011-112503

SUMMARY

According to an aspect of the embodiment, a distance measurement device includes a memory configured to store determination information, and a processor configured to perform a process including controlling an emission direction of a first laser beam in a first light projection device that emits the first laser beam and a reception direction of a laser beam in a first light reception device that receives the laser beam, obtaining an output signal that represents a reception intensity of the laser beam received by the first light reception device, determining whether or not the laser beam received by the first light reception device is a laser beam reflected by a target of distance measurement, on the basis of a reception direction of the laser beam received by the first light reception device, a period of time between when the first light projection device emits the first laser beam and when the first light reception device receives the laser beam, a reception intensity of the laser beam received by the first light reception device, and the determination information of the memory, and calculating a distance to the target on the basis of a period of time between when the first light projection device emits the first laser beam and when the first light reception device receives the laser beam, in a case when the laser beam received by the first light reception device is the laser beam reflected by the target.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 4A through FIG. 4C explain an obtainment method of determination information used for determining the emission source of a laser beam;

FIG. 10 illustrates a hardware configuration of a computer.

DESCRIPTION OF EMBODIMENTS

Preferred embodiments of the present invention will be explained with reference to accompanying drawings.

Emitting laser beams from a plurality of laser distance measurement devices makes it possible to reduce a possibility of each of the laser distance measurement devices receiving laser beams emitted from other laser distance measurement devices and to suppress false detection of a target. However, when a laser distance measurement device has received a laser beam emitted from a different laser distance measurement device, it falsely detects the target. Hereinafter, explanations will be given for a technique of preventing false detection of a target when a plurality of laser distance measurement devices are used for measuring the distances to the target.

First Embodiment

Figure 1:
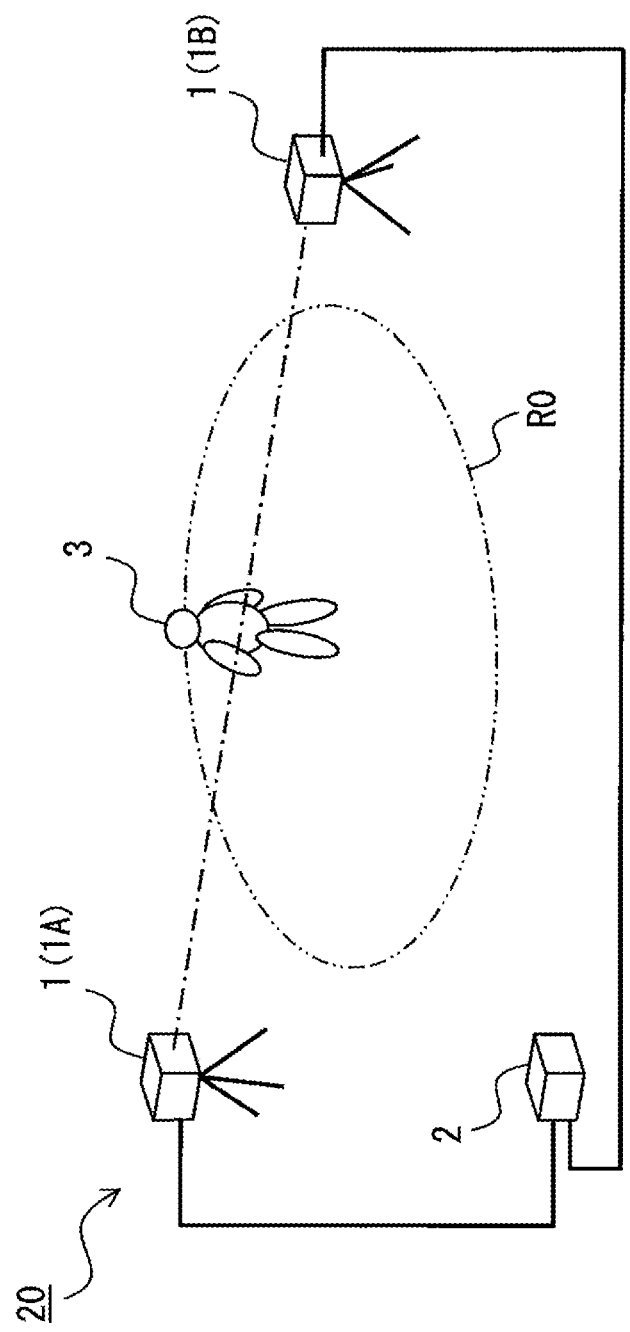
FIG. 1 illustrates a configuration example of a distance measurement system.

FIG. 1 illustrates a configuration example of a distance measurement system.

A distance measurement device according to the present embodiment (which will be referred to as a laser distance measurement device hereinafter) is a device that measures the distance to a target existing within a measurement scope (scanning scope) by scanning the emission direction of a laser beam. As illustrated in FIG. 1, laser distance measurement devices 1 (1A, 1B) are used for measuring the distance to a target 3 that moves in prescribed area R0 and that changes its orientation or shape, such as for example a person etc. existing in prescribed area R0.

This type of the laser distance measurement device 1 is applied to a distance measurement system 20 in which for example the two laser distance measurement devices 1A and 1B are arranged face to face having, between them, area R0 in which the target 3 can move as illustrated in FIG. 1. In the distance measurement system 20, while the laser distance measurement device 1A is measuring the distance to the target 3, the laser distance measurement device 1B can simultaneously measure the state (distance) of the back side of the target 3, which the laser distance measurement device 1A is not allowed to measure.

Further, when each of the two laser distance measurement devices 1A and 1B arranged face to face measures the distance to the target 3, the scan controls of laser beams in the two laser distance measurement devices 1A and 1B are synchronized. Synchronizing scan controls of laser beams makes it possible to efficiently calculate the position, orientation, shape, etc. of the target 3 based on the measurement results. In the distance measurement system 20 illustrated in FIG. 1, a synchronization control device 2 connected to each of the two laser distance measurement devices 1A and 1B synchronizes the scan controls of laser beams in the laser distance measurement devices 1A and 1B. In the following explanations, the two laser distance measurement devices 1A and 1B will respectively be referred to as a first laser distance measurement device 1A and a second laser distance measurement device 1B when the two laser distance measurement devices 1A and 1B are to be distinguished.

Figure 2:
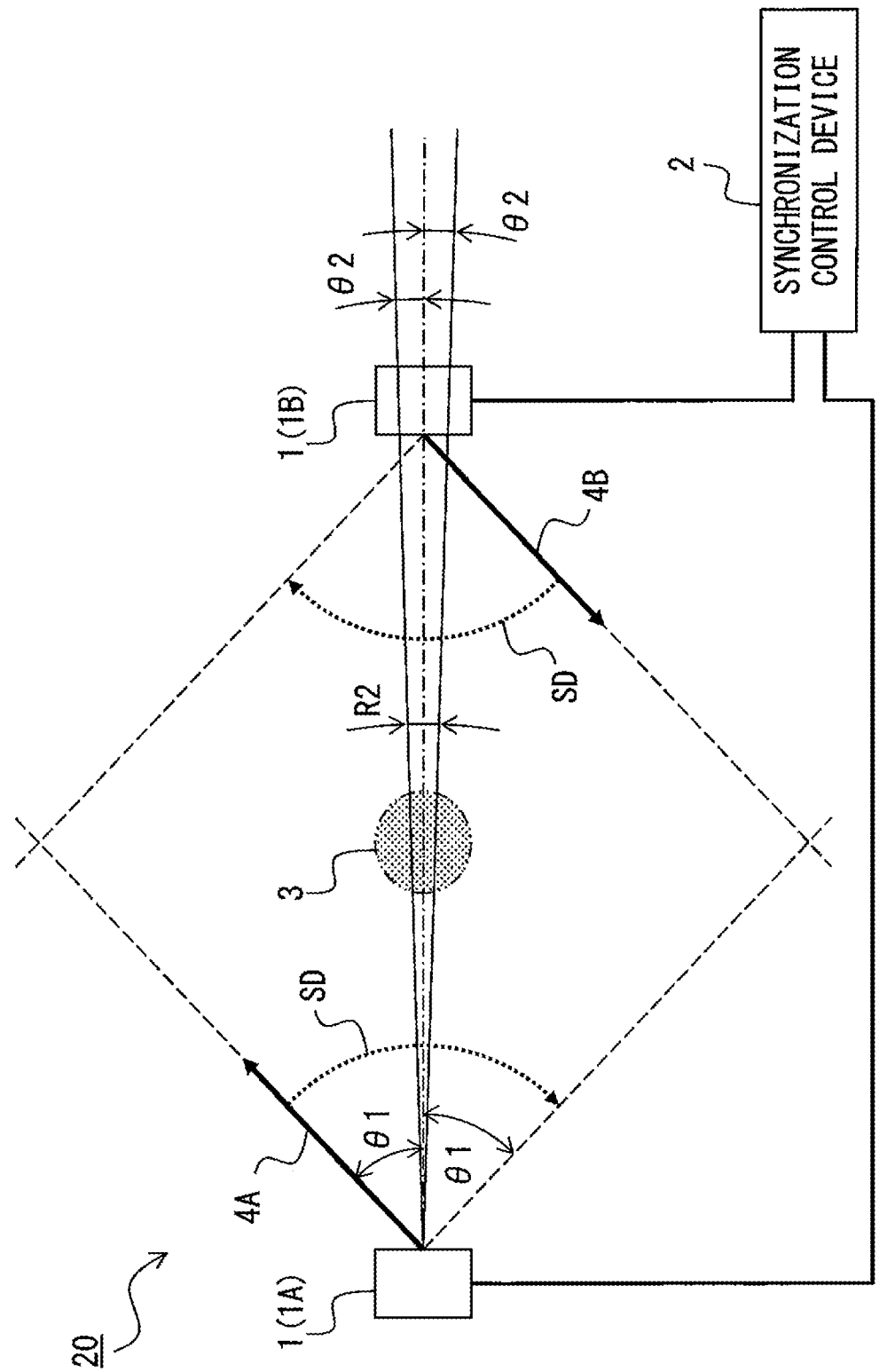
FIG. 2 explains a measurement method of a distance by using the laser distance measurement device of the first embodiment.

FIG. 2 explains a measurement method of a distance by using the laser distance measurement device of the first embodiment.

As illustrated in FIG. 2, the first laser distance measurement device 1A according to the present embodiment scans, by using a laser beam 4A, the angle scope of ±θ1 on the horizontal plane having, at its center, the front direction in which the second laser distance measurement device 1B (external device) is arranged. For example, the first laser distance measurement device 1A measures a period of time taken before it received a laser beam reflected by the target 3 and after it had emitted the laser beam 4A, while changing the emission direction of the laser beam 4A from the direction of −θ1 degrees to +θ1 degrees on the horizontal plane. Note that within one time of scanning using the laser beam 4A, the first laser distance measurement device 1A performs the above measurement a prescribed number of times on the horizontal plane while changing the position in the vertical directions (i.e. height).

Further, the first laser distance measurement device 1A calculates the distance to the target existing in the reception direction of the laser beam on the basis of the speed of the laser beam 4A (i.e. speed of light) and the measured period of time.

Also, the second laser distance measurement device 1B, which is an external device for the first laser distance measurement device 1A, performs the same operation as that of the first laser distance device 1A so as to calculate the distance to the target existing in the reception direction of the laser beam. In other words, although it is not illustrated in FIG. 2, the second laser distance measurement device 1B, similarly to the first laser distance measurement device 1A, scans, by using the laser beam 4B, the angle scope of ±θ1 that has, at its center, the front direction in which the first laser distance measurement device 1A is arranged. Also, the second laser distance measurement device 1B measures a period of time taken before it received a laser beam reflected by the target and after it had emitted the laser beam 4B, while changing the emission direction of the laser beam 4B from the direction of −θ1 degrees through to +θ1 degrees on the horizontal plane. Note that in one time of scanning using the laser beam 4B, the second laser distance measurement device 1B performs the above measurement of periods of time a prescribed number of times on the horizontal plane while changing the position in the vertical directions (i.e. height).

Further, the second laser distance measurement device 1B calculates the distance to the target existing in the reception direction of the laser beam on the basis of the speed of the laser beam 4B and the measured period of time.

In addition, the present embodiment makes the synchronization control device 2 synchronize the scan using the laser beam 4A performed by the first laser distance measurement device 1A and the scan using the laser beam 4B performed by the second laser distance measurement device 1B. For example, before starting measurement of a distance, the synchronization control device 2 first makes equal to each other the angle scope of the emission direction of the laser beam 4A on the horizontal plane in the first laser distance measurement device 1A and the angle scope of the emission direction of the laser beam 4B in the horizontal plane in the second laser distance measurement device 1B. Also, the synchronization control device 2, when starting measurement of a distance, makes the emission direction of the laser beam 4A seen from the first laser distance measurement device 1A and the emission direction of the laser beam 4B seen from the second laser distance measurement device 1B coincide with each other. For example, the emission directions respectively of the laser beam 4A and the laser beam 4B upon the start of measurement are made to be in the direction of −θ1 (direction illustrated in FIG. 2) on the horizontal plane, and the emission positions (heights) and emission angles in the vertical directions are made equal. Thereafter, the synchronization control device 2 makes the first laser distance measurement device 1A and the second laser distance measurement device 1B start their measurement of distances simultaneously.

While distances are being measured, the scanning speed in scanning direction SD of the laser beam 4A by the first laser distance measurement device 1A and the scanning speed in scanning direction SD of the laser beam 4B by the second laser distance measurement device 1B are made equal. Also, while the distances are being measured, a time at which the first laser distance measurement device 1A emits the laser beam 4A and a time at which the second laser distance measurement device 1B emits the laser beam 4B are made to coincide. Further, when scanning in scanning direction SD on the horizontal plane is terminated and the emission position (height) and the emission angle in the horizontal directions are changed, they are changed by the same amounts.

As described above, synchronization between the scan by the first laser distance measurement device 1A by using the laser beam 4A and the scan by the second laser distance measurement device 1B by using the laser beam 4B makes it possible to efficiently calculate the position, orientation, shape, etc. of the target based on the measurement results.

However, synchronization of the scan controls of the laser beams 4A and 4B between the laser distance measurement devices 1A and 1B may lead to a situation where the laser beam 4A emitted from the first laser distance measurement device 1A is received by the second laser distance measurement device 1B.

In FIG. 2, when the emission direction of the laser beam 4A emitted from the first laser distance measurement device 1A is the installation direction of the second laser distance measurement device 1B and the target 3 does not exist in the traveling path of the laser beam 4A, the laser beam 4A reaches the second laser distance measurement device 1B. Then, the reception direction of the laser beam in the second laser distance measurement device 1B roughly coincides with the direction of the first laser distance measurement device 1A that it faces. Accordingly, the second laser distance measurement device 1B receives the laser beam 4A emitted from the first laser distance measurement device 1A toward the second laser distance measurement device 1B. For example, when the emission direction of the laser beam 4A emitted from the first laser distance measurement device 1A is in angle scope R2 of ±θ2 that has the front direction as its center, the second laser distance measurement device 1B receives the laser beam 4A emitted from the first laser distance measurement device 1A.

The second laser distance measurement device 1B that has received the laser beam 4A emitted from the first laser distance measurement device 1A, emitted the laser beam 4B at the same time that the laser beam 4A was emitted from the first laser distance measurement device 1A. Accordingly, when the laser beam 4A has been received by the second laser distance measurement device 1B, the first laser distance measurement device 1A receives the laser beam 4B emitted from the second laser distance measurement device 1B. As described above, in each laser distance measurement device, when a laser beam emitted from the other laser distance measurement device has been received, there is no target in the emission direction of the laser beam. Accordingly, when there does not exist a target and a laser beam emitted from the other laser distance measurement device has been received, so that the distance to the target is calculated on the basis of a reception time etc., an incorrect distance is calculated, causing an error in the measurement result of the distance to the target.

Thus, the laser distance measurement device 1 according to the present embodiment determines whether or not a laser beam received within a scope in which a laser beam emitted from the other laser distance measurement device can be received is a laser beam emitted from the device itself or a laser beam emitted from a different laser distance measurement device. Thereby, the laser distance measurement device 1 according to the present embodiment prevents measurement of an incorrect distance in a case when a laser beam emitted from a different laser distance measurement device has been received. For example, the first laser distance measurement device 1A, illustrated in FIG. 2, determines whether or not a received laser beam is a laser beam that emitted from itself and reflected by the target 3 when the emission direction of the laser beam 4A is within scope R2 of ±θ2 that has the front direction at its center. Similarly, the second laser distance measurement device 1B determines whether or not a received laser beam is a laser beam that emitted from itself and reflected by the target 3 when the emission direction of the laser beam 4B is within scope R2 of ±θ2 that has the front direction at its center.

Figure 3:
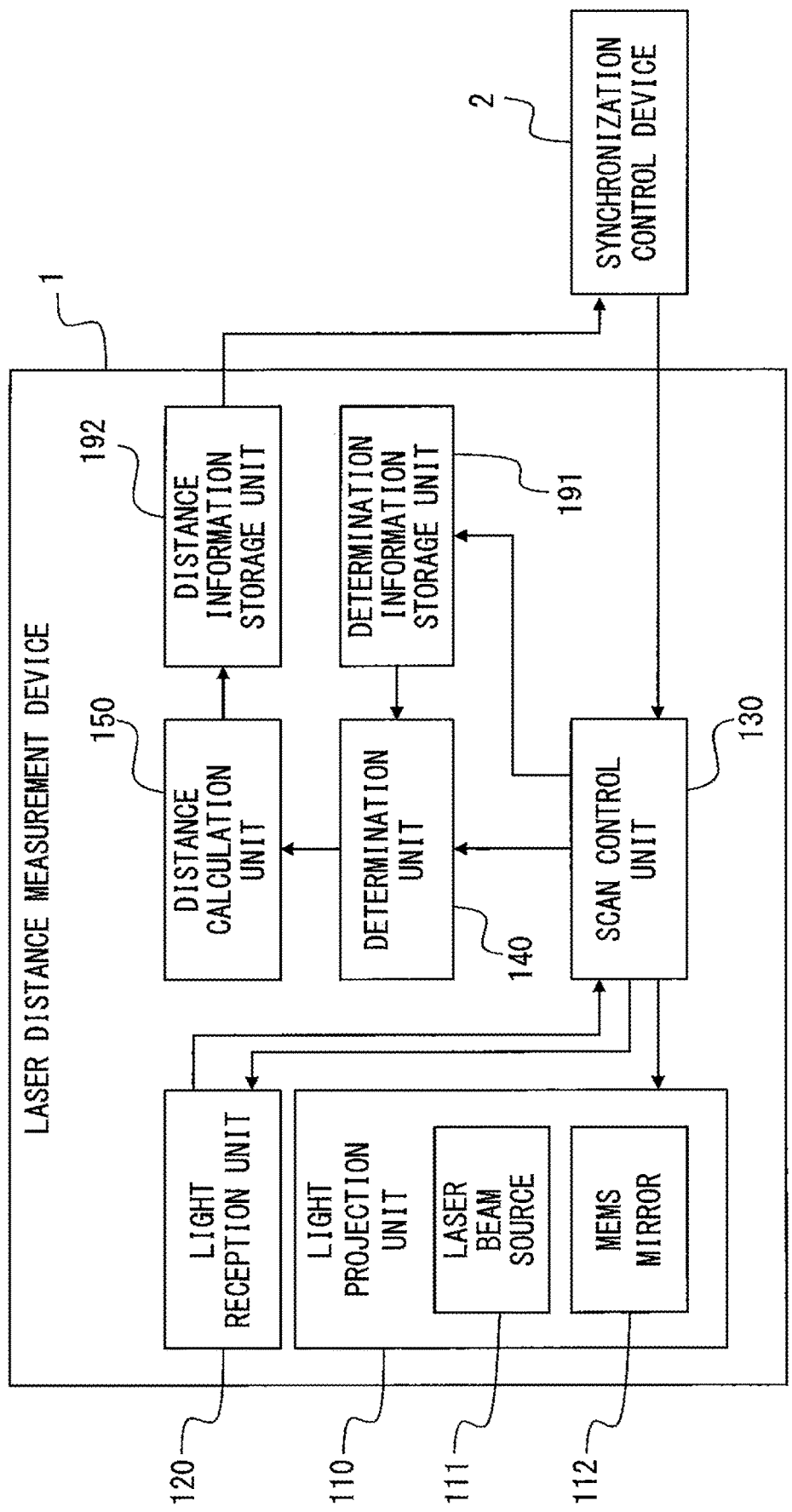
FIG. 3 illustrates a functional configuration of the laser distance measurement device according to the first embodiment.

FIG. 3 illustrates a functional configuration of the laser distance measurement device according to the first embodiment.

As illustrated in FIG. 3, the laser distance measurement device 1 according to the present embodiment includes a light projection unit 110, a light reception unit 120, a scan control unit 130, a determination unit 140 and a distance calculation unit 150. Also, the laser distance measurement device 1 includes a determination information storage unit 191 and a distance information storage unit 192.

The light projection unit 110 generates a laser beam and emits the generated laser beam in a prescribed emission direction. The light projection unit 110 includes a laser beam source 111 and a Micro Electro Mechanical Systems (MEMS) mirror 112. The laser beam source 111 is for example a laser diode. The MEMS mirror 112 is an optical component that adjusts an emission direction of the laser beam 4A generated by the laser beam source 111. Note that the light projection unit 110 includes various types of optical components such as a collimator lens (not illustrated) in addition to the laser beam source 111 and the MEMS mirror 112.

The light reception unit 120 receives a laser beam entering from the outside. The light reception unit 120 includes for example a condensing lens, a multi-division light receiving element, etc. (not illustrated).

The scan control unit 130 controls the emission direction of a laser beam emitted from the light projection unit 110 and the entering direction (reception direction) of a laser beam received by the light reception unit 120.

The determination unit 140 determines the emission source of a laser beam received by the light reception unit 120. In other words, the determination unit 140 determines whether or not a laser beam received by the light reception unit 120 is a laser beam emitted from the light projection unit 110 of the device to which it belongs. The determination unit 140 determines whether or not a received laser beam is a laser beam emitted from the device to which it belongs on the basis of the reception direction of the laser beam, the period of time from the emission to the reception of the laser beam, the reception intensity and the determination information stored in the determination information storage unit 191. Determination information stored in the determination information storage unit 191 includes area information, period-of-time information and intensity information. Area information is information representing scope R2 in which a laser beam emitted from the other laser distance measurement device arranged opposite can be received. Period-of-time information is information representing a period of time taken before a laser beam emitted from the other laser distance device arranged opposite is received by the light reception unit 120. Intensity information is information representing a threshold for a reception intensity of a laser beam used for identification between a laser beam reflected by the target and a laser beam emitted from the other laser distance measurement device.

The distance calculation unit 150 calculates the distance to the target on the basis of a period of time taken before the emission and the reception of a laser beam and a speed of the laser beam (speed of light). The laser distance measurement device 1 of the present embodiment calculates the distance to a target only when a received laser beam is a laser beam emitted from itself. The distance calculation unit 150 stores distance information including the calculated distance and the reception direction of a laser beam in for example the distance information storage unit 192.

As described above, the laser distance measurement device 1 according to the present embodiment includes the determination unit 140 that determines the emission source of a laser beam received by the light reception unit 120 and the determination information storage unit 191 that stores determination information used for determining the emission source of a laser beam.

Determination information stored in the determination information storage unit 191 is obtained by arranging two laser distance measurement devices 1 in combination in accordance with a condition for distance measurement and making them operate before starting measurement of the distance to the target 3. For obtaining determination information, the scan control unit 130 in each laser distance measurement device 1 for example can be used.

Hereinafter, by referring to FIG. 4A through FIG. 4C, explanations will be given for an obtainment method of determination information in the first laser distance measurement device 1A and the second laser distance measurement device 1B illustrated in FIG. 2.

FIG. 4A through FIG. 4C explain an obtainment method of determination information used for determining the emission source of a laser beam. FIG. 4A explains a scan method in the emission direction of a laser beam. FIG. 4B is a graph illustrating a relationship between the emission direction of a laser beam and a reception intensity of a laser beam received by a light reception device. FIG. 4C is a graph illustrating a relationship between a period of time that elapsed after the emission of a laser beam and a reception intensity.

The first laser distance measurement device 1A scans the emission direction of the laser beam 4A in a zigzag manner in measurement scope R1, in which the distance to the target is measured as illustrated in for example FIG. 4A. Note that in measurement scope R1 illustrated in FIG. 4A, the left and right directions are horizontal directions with respect to the ground and the upward and downward directions are vertical directions with respect to the ground. In the example illustrated in FIG. 4A, the emission direction of the laser beam 4A is moved from scan start point SS toward the horizontally right side, where the upper left corner portion of measurement area R1 is scan start point SS. In this example, scan start point SS is a direction that is tilted by $-\theta 1$ degrees to the left from the front direction of the first laser distance measurement device 1A in the horizontal plane (the direction in which the second laser distance measurement device 1B is installed) (see FIG. 2).

When the emission direction of the laser beam 4A has reached the right edge of measurement area R1, the first laser distance measurement device 1A moves the emission direction of the laser beam 4A to a point that is at the left edge of measurement area R1 and that has been shifted downward by a prescribed amount, and again moves the emission direction of the laser beam 4A toward the horizontally right side. Hereinafter, the first laser distance measurement device 1A changes the emission direction of the laser beam 4A in a zigzag manner until the emission direction of the laser beam 4A reaches the lower right corner portion (scan termination point SE) in measurement area R1. When the emission direction of the laser beam 4A has reached scan termination point SE of measurement area R1, one scan in the emission direction of the laser beam 4A for measurement area R1 is terminated. When one scan is terminated, the first laser distance measurement device 1A returns the emission direction of the laser beam 4A to scan start point SS, and starts the next scan.

Also, the second laser distance measurement device 1B performs the same scan control as the first laser distance measurement device 1A in synchronization with the scan control of the first laser distance measurement device 1A.

In the above, when the emission direction of the laser beam 4A emitted from the first laser distance measurement device 1A is represented by an angle, with zero degrees being the direction in which the second laser distance measurement device 1B is installed (front direction), emission direction $\theta$ of the laser beam 4A in the horizontal plane is $-\theta 1 \leq \theta \leq \theta 1$. In scope R2 where emission direction $\theta$ satisfies $-\theta 2 \leq \theta \leq \theta 2$, which is close to zero degrees within $-\theta 1 \leq \theta \leq \theta 1$, the laser beam 4A emitted from the first laser distance measurement device 1A travels toward scope R2, in which reception is possible in the second laser distance measurement device 1B. When the target 3 does not exist in the traveling path (optical path) of the laser beam 4A, the laser beam 4A having emission direction $\theta$ that satisfies $-\theta 2 \leq \theta \leq 74\ 2$ enters the light reception unit 120 of the second laser distance measurement device 1B. By contrast, the laser beam 4A having emission direction $\theta$ that satisfies $\theta < -\theta 2$ or $\theta 2 < \theta$ does not enter the light reception unit 120 of the second laser distance measurement device 1B.

When emission direction $\theta$ of the laser beam 4A emitted from the first laser distance measurement device 1A satisfies $-\theta 2 \leq \theta \leq \theta 2$, emission direction $\theta$ of the laser beam 4B emitted from the second laser distance measurement device 1B that it faces also satisfies $-\theta 2 \leq \theta \leq \theta 2$. Accordingly, when emission direction $\theta$ of the laser beam 4A emitted from the first laser distance measurement device 1A satisfies $-\theta 2 \leq \theta \leq \theta 2$ and the target 3 does not exist in the optical path, the first laser distance measurement device 1A receives the laser beam 4B emitted from the second laser distance measurement device 1B.

Accordingly, when the scan controls are synchronized between the two laser distance measurement devices 1A and 1B arranged face to face without the target 3 existing in measurement area R1, the reception intensities of laser beams received by the laser distance measurement devices 1A and 1B are as illustrated as a distribution 1001, which is represented by the thick line in FIG. 4B. Note that in the graph illustrated in FIG. 4B, the horizontal axis represents emission directions of laser beams on the horizontal plane and the vertical axis represents reception intensities of received laser beams. Also, reception intensity INO in the graph of FIG. 4B is a reception intensity equivalent to the emission intensities of the laser beams 4A and 4B emitted from the laser distance measurement devices 1A and 1B. The scan control unit 130 of each of the laser distance measurement devices 1A and 1B calculates scope R2 ($-\theta 2 \leq \theta \leq \theta 2$) in which the laser beam 4 emitted from the other laser distance measurement device can be received, on the basis of the distribution 1001, which is represented by the thick line in FIG. 4B. The scan control unit 130 of each of the laser distance measurement devices 1A and 1B stores, in the determination information holding unit 191 of itself, calculated scope R2 as one piece of determination information used for the determination of the emission source of a laser beam (area information).

Also, when the laser beams 4A and 4B are reflected by the target 3, the laser beams scatter on the reflection plane of the target 3. Thus, when the laser beams received by the respective laser distance measurement devices 1A and 1B are laser beams emitted from themselves and reflected by the target 3, the reception intensities of the received laser beams are a distribution 1002, which is represented by the dotted lines in FIG. 4B. In other words, the reception intensity in a case when each of the laser distance measurement devices 1A and 1B received a laser beam reflected by the target 3 is much lower than the reception intensity in a case when a laser beam emitted from the other laser distance measurement device has been received. Accordingly, on the basis of the maximum value of reception intensities in a case when a laser beam reflected by the target 3 has been received and the reception intensity in a case when a laser beam emitted from the other laser distance measurement device has been received, intensity threshold TH1, which is used for determination of the emission source of a laser beam, can be used. The maximum value of reception intensities in a case when a laser beam reflected by the target 3 has been received is smaller by a single or double-digit difference than the reception intensity in a case when a laser beam emitted from the other laser distance measurement device has been received. Accordingly, intensity threshold TH1 can also be estimated from for example a reception intensity in a case when a laser beam emitted from the other laser distance measurement device has been received. The scan control unit 130 of the each of the laser distance measurement devices 1A and 1B stores determined intensity threshold TH1 in the determination information storage unit 191 of the device to which it belongs, as a piece of determination information used for determination of the emission source of a laser beam (intensity information).

Further, because the scan controls are synchronized between the two laser distance measurement devices 1A and 1B arranged face to face, the laser beam 4B was emitted from the second laser distance measurement device 1B at the same time as the time at which the first laser distance measurement device 1A emitted the laser beam 4A. Thus, when the target 3 does not exist in measurement area R1, each of the laser distance measurement devices 1A and 1B can determine the time at which the other laser distance measurement device emitted the laser beam that it received, on the basis of the emission time of the laser beam 4A or 4B in itself. As illustrated in FIG. 4C, each of the laser distance measurement devices 1A and 1B treats period of time TH2 between time T0, at which it emitted a laser beam, and time T1, at which it received a laser beam, as a period of time that is taken before receiving a laser beam emitted from the other laser distance measurement device. The graph illustrated in FIG. 4C is a graph that has the horizontal axis representing periods of time and the vertical axis representing reception intensities of received laser beams, and illustrates a temporal change 1003 of a reception intensity in the light reception unit 120 at and after time T0, at which a laser beam was emitted. The scan control unit 130 of each of the laser distance measurement devices 1A and 1B stores calculated period of time TH2 in the determination information storage unit 191 of the device to which it belongs, as a piece of determination information used for determination of the emission source of a laser beam (period-of-time information).

As described above, when the laser distance measurement devices 1 according to the present embodiment are arranged face to face so as to measure the distance to a target, determination information is obtained beforehand by operating each of the laser distance measurement devices 1 (1A and 1B) in accordance with the same measurement condition as that for the measurement without a target existing within the measurement scope.

In the measurement method of a distance according to the present embodiment, determination information (area information, intensity information and period-of-time information) used for determination of the emission source of a laser beam is obtained in the above prior process, and thereafter measurement of the distance to the target is started by the two laser distance measurement devices 1A and 1B. In the above, the scan controls for the laser beam 4A and laser beam 4B in the laser distance measurement devices 1A and 1B are synchronized by the synchronization control device 2.

After starting the measurement of the distances, the two laser distance measurement devices 1A and 1B respectively calculate the distances to the target for each emission direction while respectively scanning the emission directions of the laser beams and outputs from the light reception unit 120. While measuring the distances to the target, each laser distance measurement device 1 repeatedly performs the processes from step S1 through step S7 illustrated in FIG. 5.

Figure 5:
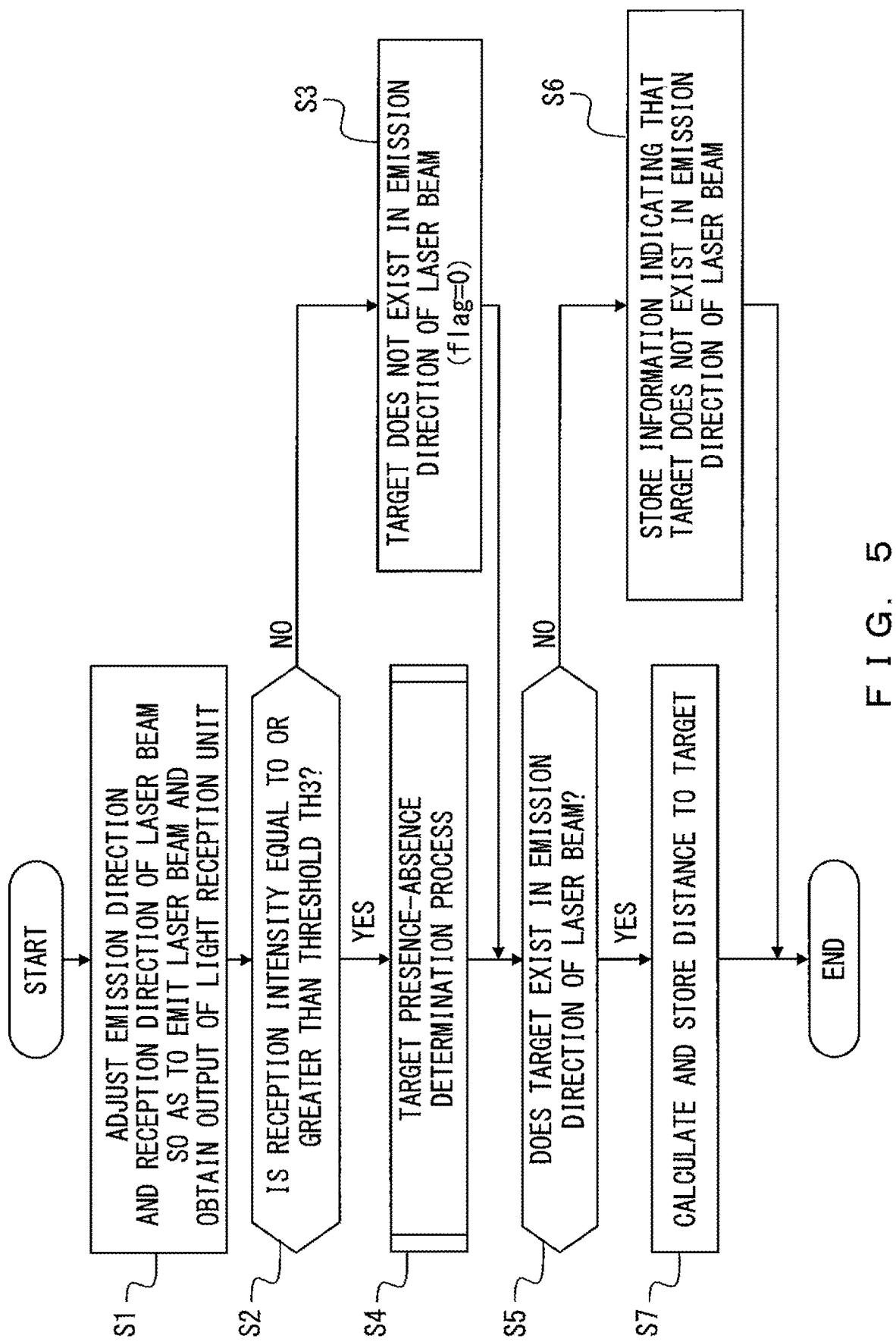
FIG. 5 is a flowchart explaining a process performed by the laser distance measurement device according to the first embodiment when a distance is measured.

FIG. 5 is a flowchart explaining a process performed by the laser distance measurement device according to the first embodiment when a distance is measured.

The laser distance measurement device 1 according to the present embodiment first adjusts the emission direction and the reception direction of a laser beam so as to emit a laser beam and obtains an output from the light reception unit 120 (step S1). The process in step S1 is performed by the scan control unit 130. Under synchronization control performed by the synchronization control device 2, the scan control unit 130 adjusts for example the orientations of the MEMS mirror 112 of the light projection unit 110 and the light reception unit 120, and emits a laser beam at the same time as the emission time of a laser beam in the other laser distance measurement device 1. Thereafter, the scan control unit 130 obtains an output signal from the light reception unit 120 in accordance with the intensity of a laser beam that has been received (that has entered), and calculates the reception intensity. After obtaining an output signal from the light reception unit 120, the scan control unit 130 outputs, to the determination unit 140, the emission time, reception time, reception direction and calculated reception intensity of the laser beam.

Next, the laser distance measurement device 1 determines whether or not the reception intensity of the laser beam is equal to or higher than threshold TH3 (step S2). The determination in step S2 is performed by the determination unit 140. The determination unit 140 determines whether or not the reception intensity of the laser beam is equal to or higher than threshold TH3 on the basis of the reception intensity obtained from the scan control unit 130. In this example, threshold TH3 is a value set on the basis of the minimum value of the reception intensities of a laser beam entering the light reception unit 120 after being reflected by the target 3. When the reception intensity of the laser beam is lower than threshold TH3 (NO in step S2), the determination unit 140 reports, to the distance calculation unit 150, information indicating that a target does not exist in the emission direction of the laser beam (step S3). In step S3, the determination unit 140 sets for example the value of a determination flag representing whether or not a target exists in the emission direction of the laser beam to "0", which indicates that a target does not exist in the emission direction of the laser beam, and reports it to the distance calculation unit 150.

When the reception intensity of the laser beam is equal to or higher than threshold TH3 (YES in step S2), the determination unit 140 goes on to perform a target presence-absence determination process (step S4). In the target presence-absence determination process, the determination unit 140 determines whether or not a target exists in the emission direction of the laser beam on the basis of the emission time, reception time, reception direction and reception intensity of the laser beam and the determination information stored in the determination information storage unit 191. The determination unit 140 sets the value of the determination flag to "1" and to "0" respectively when for example a target exists and does not exist in the emission direction of the laser beam. The determination unit 140 reports the result of the target presence-absence determination process (determination flag) to the distance calculation unit 150.

After step S3 or step S4, the distance calculation unit 150 determines whether or not the result of the process by the determination unit 140 is a determination result that "a target exists in the emission direction of the laser beam" on the basis of the value of the determination flag received from the determination unit 140 (step S5). When a target does not exist in the emission direction of the laser beam (NO in step S5), the distance calculation unit 150 stores, in the distance information storage unit 192, information indicating that a target does not exist in the emission direction of the laser beam (step S6).

When a target exists in the emission direction of the laser beam (YES in step S5), the distance calculation unit 150 calculates the distance to the target and stores the distance in the distance information storage unit 192 (step S7). In step S7, the distance calculation unit 150 calculates the distance to the target on the basis of emission time T0, reception time T2 and difference (T2−T0) of the laser beam that is currently being processed and the speed of the laser beam (speed of light).

When terminating the processes in step S6 or step S7, the laser distance measurement device 1 terminates the measurement process for the emission direction of the laser beam that is currently being processed. The laser distance measurement device 1 performs the processes from step S1 through step S7 for each emission direction of a laser beam. The laser distance measurement device 1 may start the processes in step S1 through step S7 for the next emission direction after terminating the processes in step S1 through step S7 for an emission direction or may perform the processes in step S1 through step S7 after performing pipelining.

As described above, in the process performed by the laser distance measurement device 1 of the present embodiment for measuring a distance, when the reception intensity of a laser beam is equal to or higher than threshold TH3, whether or not a target exists in the emission direction of the laser beam is determined through a target presence-absence determination process in order to identify the emission source of the received laser beam. In the above, the laser distance measurement device 1 identifies the emission source of the received laser beam on the basis of the reception direction of the laser beam, a period of time between the emission and reception of the laser beam, and the reception intensity of the received laser beam. Hereinafter, by referring to FIG. 6, explanations will be given for the contents of the target presence-absence determination process (step S4) performed by the determination unit 140.

Figure 6:
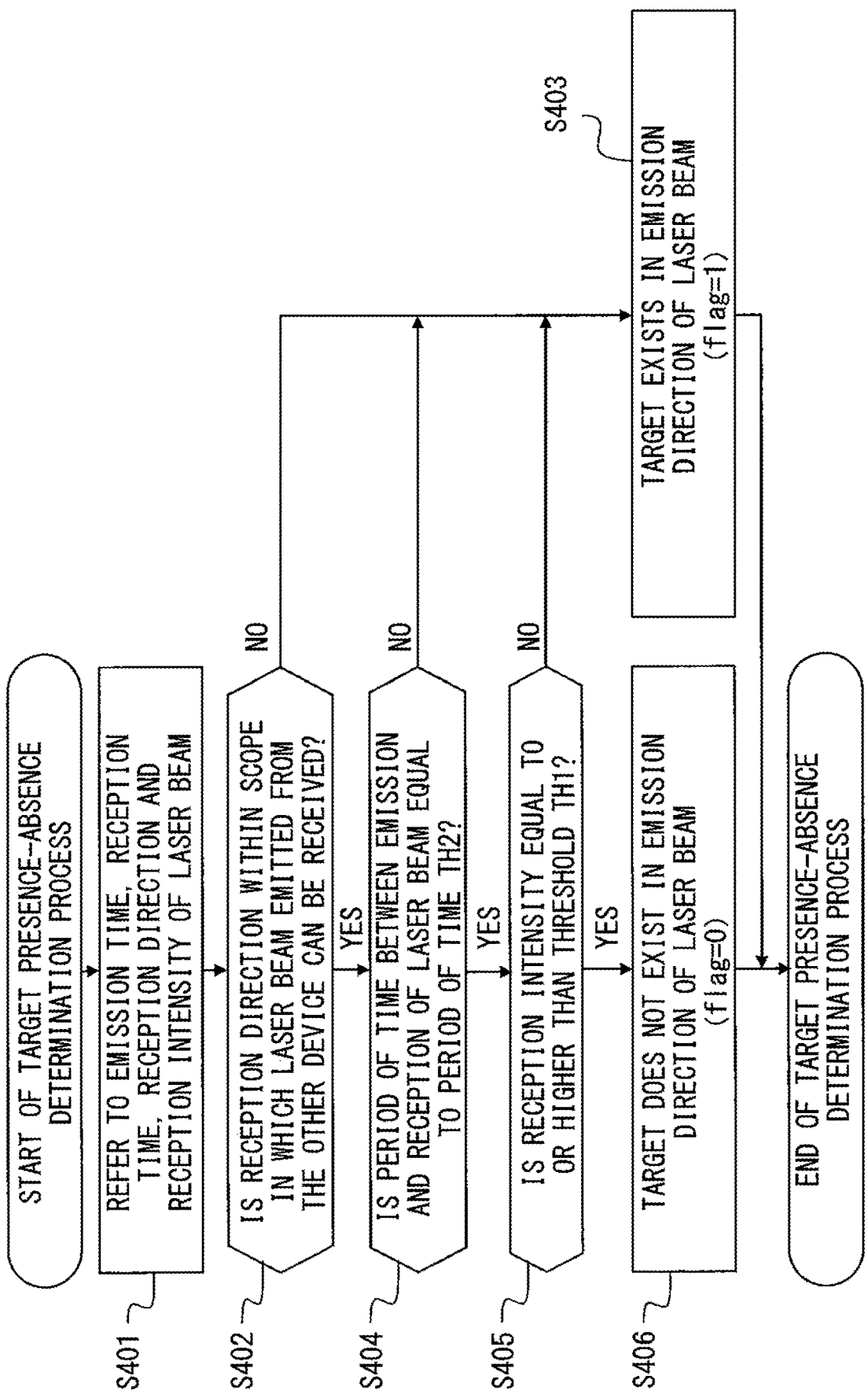
FIG. 6 is a flowchart explaining the contents of a target presence-absence determination process.

FIG. 6 is a flowchart explaining the contents of a target presence-absence determination process.

In a target presence-absence determination process, the determination unit 140 first refers to emission time T0, reception time T2, reception direction and reception intensity of the laser beam received from the scan control unit 130 (step S401).

Next, the determination unit 140 refers to area information from determination information so as to determine whether or not the reception direction of the laser beam is within scope R2 in which a laser beam emitted from the other laser distance measurement device can be received (step S402). When the reception direction of the laser beam is not within scope R2 (NO in step S402), the determination unit 140 sets the value of the determination flag to "1", which indicates that a target exists in the emission direction of the laser beam (step S403). When a process in step S403 has been performed, the determination unit 140 outputs, to the distance calculation unit 150, information including the value "1" of the determination flag and the emission and reception times of the laser beam and the reception direction (emission direction) of the laser beam, and terminates the target presence-absence determination process.

When the reception direction of the laser beam is within scope R2 (YES in step S402), the determination unit 140 next refers to the period-of-time information in the determination information, and determines whether or not the period of time between the emission and reception of the laser beam is equal to prescribed period of time TH2 (step S404). In this example, when a difference between period of time (T2−T0) calculated on the basis of emission time T0 and reception time T2 of the laser beam and prescribed period of time TH2 is within a prescribed threshold scope, the determination unit 140 determines that the two periods of time are equal. When the two periods of time are different (NO in step S404), the determination unit 140 next performs the process in step S403.

When the two periods of time are equal (YES in step S404), the determination unit 140 next refers to the intensity information in the determination information, and determines whether or not the reception intensity is equal to or higher than threshold TH1 (step S405). When the reception intensity is lower than threshold TH1 (NO in step S405), the determination unit 140 next performs the process in step S403.

When the reception intensity is equal to or higher than threshold TH1 (YES in step S405), the determination unit 140 sets the value of the determination flag to "0", which indicates that a target does not exist in the emission direction of the laser beam (step S406). When a process in step S406 has been performed, the determination unit 140 outputs, to the distance calculation unit 150, information including the value "0" of the determination flag, the emission and reception times of the laser beam and the reception direction (emission direction) of the laser beam, and terminates the target presence-absence determination process.

As described above, in a target presence-absence determination process according to the present embodiment, the determination unit 140 first determines whether or not the reception direction of a laser beam is within a scope R2 in which a laser beam emitted from the other laser distance measurement device can be received. When the reception direction of the laser beam is within scope R2, the determination unit 140 determines whether or not the emission source of the received laser beam is the device to which it belongs or the other laser distance measurement device on the basis of the period of time before the reception of the laser beam and the reception intensity.

FIG. 7A through FIG. 7F explain a relationship between a period of time before reception of a laser beam and a reception intensity of the laser beam.

Figure 7A:
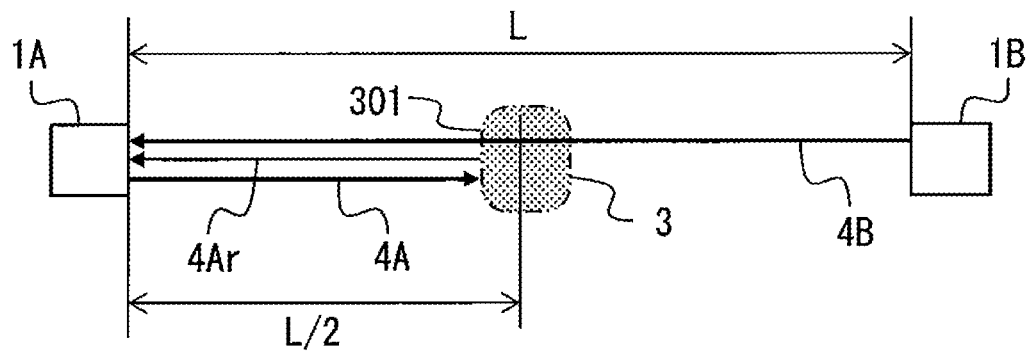
FIG. 7A through FIG. 7F explain a relationship between a period of time before reception of a laser beam and a reception intensity of the laser beam.

FIG. 7A illustrates a first example about a positional relationship between the two laser distance measurement devices 1A and 1B and the target 3. The first laser distance measurement device 1A and the second laser distance measurement device 1B are arranged face to face in such a manner that the optical distance is distance L.

Figure 7B:
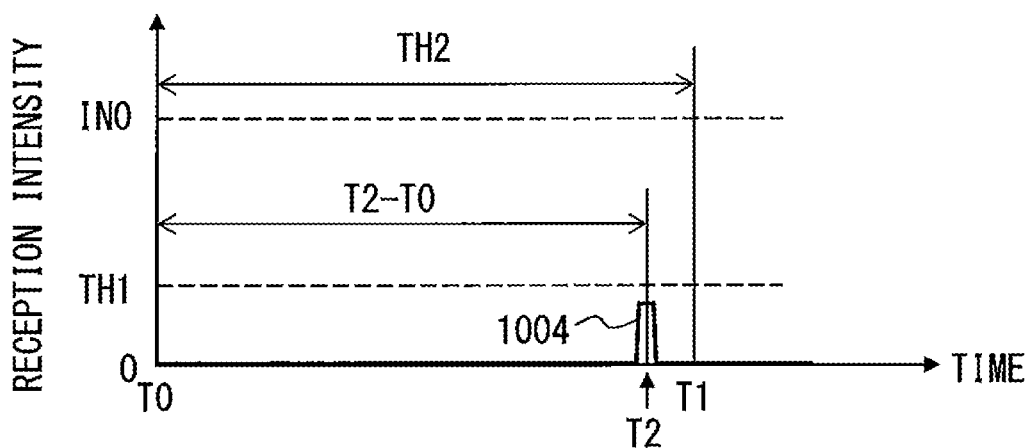
Figure 7C:
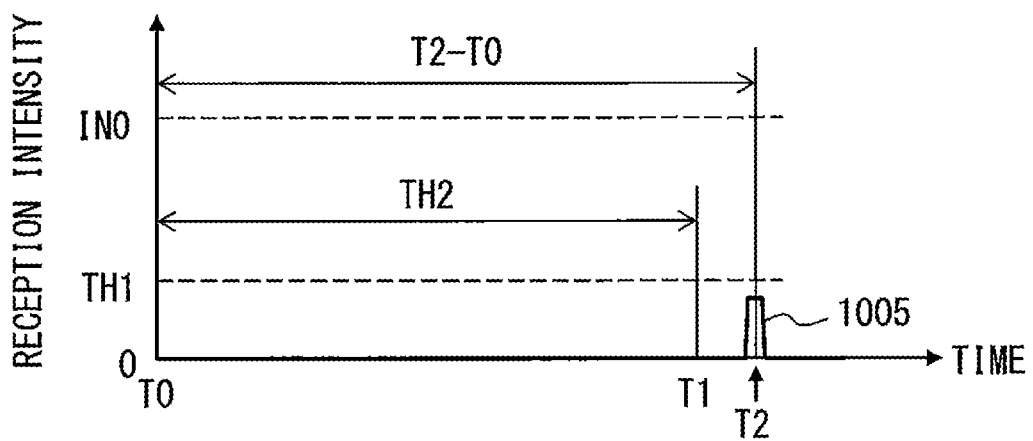

When the target 3 does not exist in the optical path of laser beams emitted from the laser distance measurement devices 1A and 1B in the front directions, the first laser distance measurement device 1A receives the laser beam 4B emitted from the second laser distance measurement device 1B. Then, the period of time between the emission of the laser beam 4A and the reception of the laser beam 4B in the first laser distance measurement device 1A is difference (T1−T0), i.e., a difference between reception time T1 and emission time T0 of the laser beam. In the present embodiment, as illustrated in FIG. 7B and FIG. 7C, period of time (T1−T0) between the emission of the laser beam 4A and the reception of the laser beam 4B is treated as period-of-time information (prescribed period of time TH2) used for determination of the emission source of the laser beam. Note that FIG. 7B and FIG. 7C are graphs each of which has its horizontal axis representing periods of time and its vertical axis representing reception intensities.

When, by contrast, the target 3 exists in the vicinity of the center of the optical path of the laser beam 4A and the laser beam 4B emitted from the laser distance measurement devices 1A and 1B in the front directions, the laser beam 4A and the laser beam 4B emitted from the laser distance measurement devices 1A and 1B in the front directions are respectively reflected by the target 3. Thus, when the target 3 exists, the first laser distance measurement device 1A receives a laser beam 4Ar returning in the direction toward itself after being reflected by a reflection plane 301 of the target 3.

In this example, a case is assumed as illustrated in FIG. 7A in which the optical distance between the first laser distance measurement device 1A and the reflection plane 301 of the target 3 is shorter than distance L/2. In such a case, as illustrated as a distribution 1004 of the reception intensity in the graph of FIG. 7B, the period of time between emission time T0 of the laser beam 4A and the reception time T2 of the laser beam 4Ar (T2−T0) is shorter than prescribed period of time TH2. Also, when the optical distance between the first laser distance measurement device 1A and the reflection plane 301 of the target 3 is longer than distance L/2, the period of time (T2−T0) between the emission time T0 of the laser beam 4A and the reception time T2 of the laser beam 4Ar is longer than prescribed period of time TH2, as illustrated as a distribution 1005 of the reception intensity in the graph of FIG. 7C. Accordingly, when the period of time between the emission of a laser beam and the reception of the beam (T2−T0) and prescribed period of time TH2 determined in the prior process are different (NO in step S404), the received laser beam can be determined to be the laser beam 4Ar reflected by the reflection plane 301 of the target 3. In other words, when the period of time between the emission and the reception of a laser beam (T2−T0) and prescribed period of time TH2 are different, the emission source of the received laser beam can be determined to the be laser distance measurement device that emitted the beam. Accordingly, when the period of time between the emission and the reception of the laser beam (T2−T0) and prescribed period of time TH2 determined in the prior process are different, the determination unit 140 sets the value of the determination flag to a value indicating that the target 3 exists in the emission direction of the laser beam (step S403).

Figure 7D:
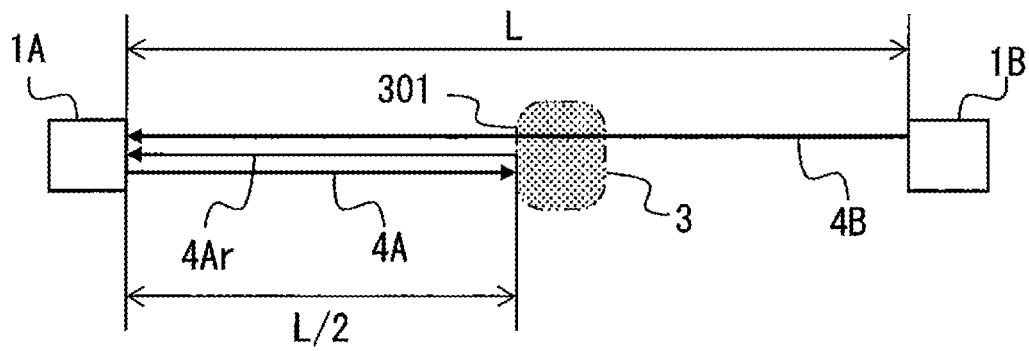
Figure 7E:
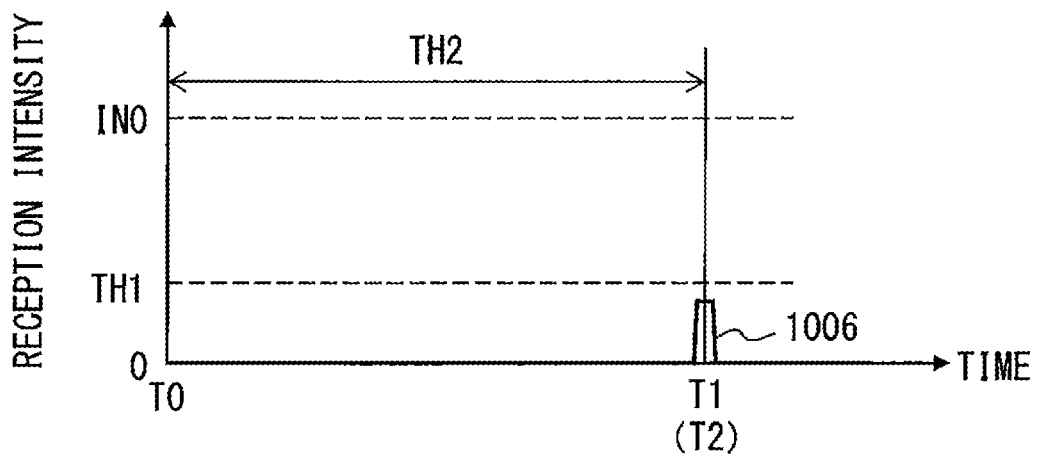

Next, as illustrated in the second example of FIG. 7D, a case is assumed in which the optical distance between the first laser distance measurement device 1A and the reflection plane 301 of the target 3 is distance L/2. In such a case, as illustrated in FIG. 7E, the period of time between emission time T0 of the laser beam 4A and the reception time T2 of the laser beam 4A (T2−T0) is equal to prescribed period of time TH2. This prevents the determination unit 140 from identifying the emission source of the received laser beam on the basis of period-of-time information. Accordingly, when the period of time between emission and reception of the laser beam (T2−T0) and prescribed period of time TH2 are equal (YES in step S404), the determination unit 140 next performs determination based on the reception intensity (step S405).

The reception intensity in a case when the laser beam received by the first laser distance measurement device 1A is the laser beam 4Ar reflected by the target 3 is lower than the reception intensity in a case when the received laser beam is the laser beam 4B emitted from the second laser distance measurement device 1B (see FIG. 4B). In the present embodiment, threshold TH1 determined on the basis of the above difference in reception intensities in the prior process is treated as intensity information used to determine the emission source of a laser beam. Accordingly, when the received laser beam is the laser beam 4Ar reflected by the target 3, the reception intensity of the laser beam at reception time T2=T1 of the laser beam is lower than threshold TH1 as illustrated as a distribution 1006 of the reception intensity in the graph of FIG. 7E. In other words, when the reception intensity of the received laser beam is lower than threshold TH1 determined in the prior process (NO in step S405), the laser beam received by the first laser distance measurement device 1A can be determined to be the laser beam 4Ar reflected by the reflection plane 301 of the target 3. Accordingly, when the reception intensity of the received laser beam is lower than threshold TH1 determined in the prior process, the determination unit 140 sets the value of the determination flag to a value indicating that the target 3 exists in the emission direction of the laser beam (step S403).

Figure 7F:
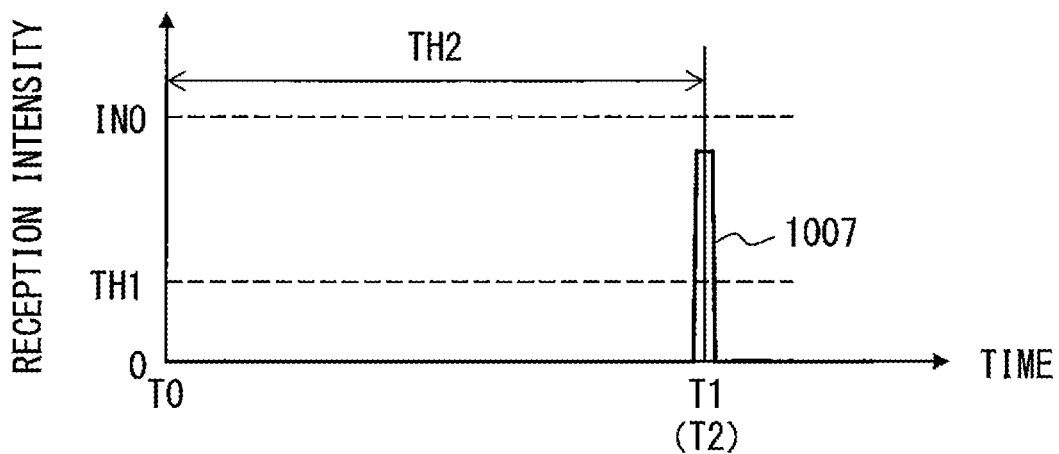

When, by contrast, the laser beam received by the first laser distance measurement device 1A is the laser beam 4B emitted from the second laser distance measurement device 1B, the reception intensity of the laser beam at reception time T=T1 of the laser beam is higher than threshold TH1, as illustrated as a distribution 1007 of the reception intensity in the graph of FIG. 7F. Accordingly, when the reception intensity of the received laser beam is equal to or higher than threshold TH1 determined in the prior process (YES in step S405), the determination unit 140 sets the value of the determination flag to a value indicating that the target 3 does not exist in the emission direction of the laser beam (step S406).

As described above, the present embodiment determines whether or not the emission source of a received laser beam is the device that emitted the laser beam or the other one of the devices that are arranged face to face, on the basis of the emission time, reception time, reception direction and reception intensity of the laser beam and determination information determined in advance. This makes it possible, in a case when scan controls of laser beams are synchronized between two laser distance measurement devices that are arranged face to face so as to measure the distance to a target, to prevent false measurement of a distance on the basis of the reception time and reception direction of a laser beam emitted from the other laser distance measurement device. Thereby, even when one of the laser distance measurement devices has received a laser beam emitted from the other laser distance measurement device, it is possible to prevent false detection in which a target not existing in measurement area R1 is detected. Further, the present embodiment determines the presence or absence of a target on the basis of a period of time between the emission and reception of a laser beam and the reception intensity of the laser beam. This makes it possible to determine a presence or absence of a target on the basis of period-of-time information, further reducing false detection of a target even when for example the surface of the target 3 has a high reflection index and a reception intensity of a laser beam is equal to or higher than threshold TH1.

Note that the flowcharts in FIG. 5 and FIG. 6 are examples of processes performed when the laser distance measurement device 1 according to the present embodiment performs distance measurement. The processes performed when the laser distance measurement device 1 according to the present embodiment performs distance measurement allows appropriate changes without departing from the spirit of the present embodiment. For example, the determination in step S402, step S404 and step S405 in a target presence-absence determination process can be executed in an arbitrary order. It is also possible for example to perform the process (step S6) of storing, in the distance information storage unit 192, information indicating that a target does not exist in the emission direction of a laser beam instead of setting the value of the determination flag to "0" in step S3 and step S406 so as to report the value to the distance calculation unit 150.

Further, when the distance to a target is measured by using the laser distance measurement devices 1 according to the present embodiment, measurement using a plurality of pairs of laser distance measurement devices is also possible, with the scope of the embodiment not being limited to measurement by using a pair of the two laser distance measurement devices 1A and 1B as illustrated in FIG. 1 and FIG. 2.

Figure 8:
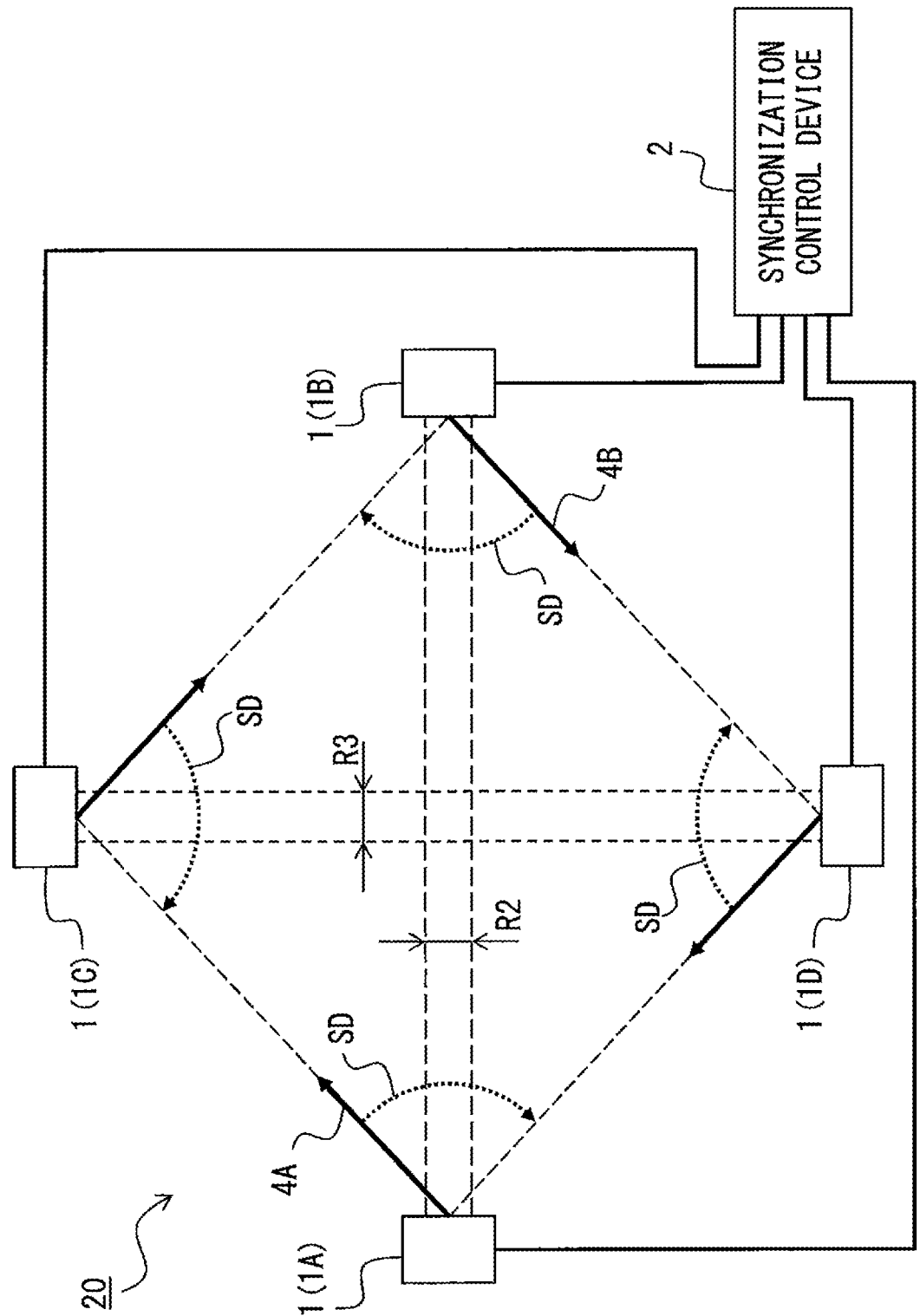
FIG. 8 illustrates another configuration example of a distance measurement system.

FIG. 8 illustrates another configuration example of a distance measurement system.

FIG. 8 illustrates a distance measurement system 20 including four laser distance measurement devices 1A through 1D as another configuration example of the distance measurement system 20 to which the laser distance measurement device 1 of the present embodiment is applied.

In the distance measurement system. 20 illustrated in FIG. 8, a pair of the first laser distance measurement device 1A and the second laser distance measurement device 1B is treated as the first pair, and they are arranged face to face having, between them, a scope within which a target can move. Also, a pair of the third laser distance measurement device 1C and the fourth laser distance measurement device 1D is treated as the second pair, and they are arranged face to face having, between them, a scope within which a target can move. In the above, the respective laser distance measurement devices 1A through 1D are arranged in such a manner that the front direction of each one of the devices of a pair is orthogonal to the front direction of the other one of the devices of that pair and that the midpoints of the optical paths of the front directions of the laser beams of the respective laser distance measurement devices of each pair roughly coincide.

The four laser distance measurement device 1A through 1D can perform scan controls of laser beams in accordance with the same scan condition. Each of the laser distance measurement devices 1A through 1D has, as its scan start direction, a direction that is inclined to the left by a prescribed angle from the front direction on the horizontal plane, and moves the emission direction of the laser beam to the right on the horizontal plane from the scan start direction. In the above, synchronization of the scan controls of laser beams between the laser distance measurement devices 1A and 1B of the first pair results in scope R2 of $\pm\theta$ that has the front direction as its center as a scope within which a laser beam emitted from the other laser distance measurement device can be received, as illustrated in FIG. 2 and FIG. 8. Similarly, synchronization of the scan controls of laser beams between the laser distance measurement devices 1C and 1D of the second pair results in scope R3 that has the front direction as its center as a scope within which a laser beam emitted from the other laser distance measurement device can be received. Accordingly, when the distance to a target is to be measured by using the four laser distance measurement devices 1A through 1D, a process of obtaining determination information for the laser distance measurement devices 1A and 1B of the first pair and a process of obtaining determination information for the laser distance measurement devices 1C and 1D of the second pair are performed in advance.

The scan control for the laser distance measurement devices 1A and 1B of the first pair and the scan control for the laser distance measurement devices 1C and 1D of the second pair do not have to be synchronized. However, it is desirable that the scan control of a laser beam in each laser distance measurement device be controlled so that a laser beam emitted from one of the laser distance measurement devices of a pair will not be received by the other one of the laser distance measurement devices of that pair.

As described above, when the distance to a target is to be measured by using the laser distance measurement device 1 according to the present embodiment, scans of laser beams in a pair including two laser distance measurement devices arranged face to face are synchronized. When the emission direction of a laser beam that was emitted from a laser distance measurement device is within scope R2 in which a laser beam is emitted from the other laser distance measurement devices, the emission source of a received laser beam is determined on the basis of the emission time, reception time and reception intensity of the laser beam. This makes it possible to prevent calculation of an incorrect distance that would be caused by receiving a laser beam emitted from the other laser distance measurement device. Accordingly, the back side of a target, which one laser distance measurement device is not allowed to measure, can be measured by the other laser distance measurement device efficiently and simultaneously. Further, using a plurality of pairs each of which includes two laser distance measurement devices can increase the number of points, on a target, that can be measured simultaneously, making it possible to efficiently obtain a measurement result at a high accuracy even when the position and shape of the target change as time elapses.

Note that an example with a pair of laser distance measurement devices (see FIG. 2) and an example with two pairs of laser distance measurement devices (see FIG. 8) that have been exemplified in the present embodiment are examples of the distance measurement system 20 that uses the laser distance measurement device 1 of the present embodiment. It need not be mentioned that the distance measurement system. 20 using the laser distance measurement device according to the present embodiment is not limited to the above examples and may include for example three or more pairs of laser distance measurement devices.

Further, while the present embodiment has illustrated an example in which a pair of two laser distance measurement devices is used for measuring the distance to a target, the measurement of the distance to a target according to the present embodiment is not limited to this and may use one laser distance measurement device 1. For example, when the distance to a target is to be measured by using one laser distance measurement device 1 in fixed point observation etc., an external device that emits a laser beam may exist within a measurement scope and the laser distance measurement device 1 may receive the laser beam emitted from the external device. In such a case as well, by treating the external device as the other laser distance measurement device so as to perform a prior process and obtaining determination information, it is possible to determine whether the emission source of the received laser beam is the device itself or an external device. This makes it possible for the laser distance measurement device 1 of the present embodiment to avoid calculating an incorrect distance and falsely detecting a target in a case when the laser distance measurement device 1 has received a laser beam emitted from an external device including the other laser distance measurement device that is arranged facing the laser distance measurement device 1.

Second Embodiment

Figure 9:
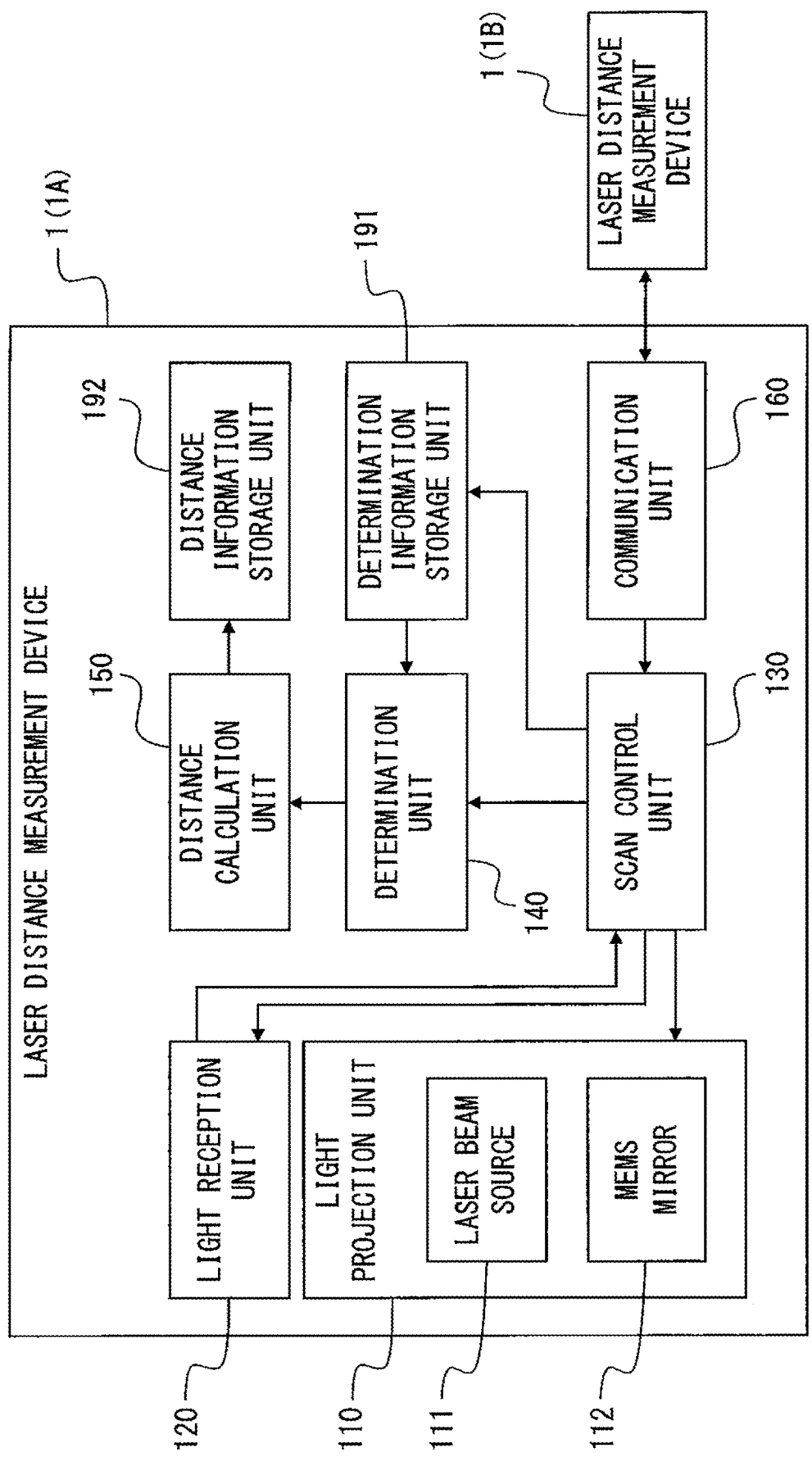
FIG. 9 illustrates a functional configuration of a laser distance measurement device according to the second embodiment.

FIG. 9 illustrates a functional configuration of a laser distance measurement device according to a second embodiment.

As illustrated in FIG. 9, the laser distance measurement device 1 of the present embodiment includes the light projection unit 110, the light reception unit 120, the scan control unit 130, the determination unit 140, the distance calculation unit 150 and a communication unit 160. Also, the laser distance measurement device 1 includes the determination information storage unit 191 and the distance information storage unit 192.

The light projection unit 110, the light reception unit 120, the scan control unit 130, the determination unit 140 and the distance calculation unit 150 in the laser distance measurement device 1 of the present embodiment respectively have functions as explained in the first embodiment. Also, determination information stored in the determination information storage unit 191 and distance information stored in the distance information storage unit 192 are respectively as explained in the first embodiment.

The communication unit 160 in the laser distance measurement device 1 of the present embodiment performs a communication for synchronizing scan controls of laser beams between the two laser distance measurement devices 1 (1A and 1B) that are arranged face to face. In other words, the communication unit 160 includes a function as the synchronization control device 2 explained in the first embodiment. In accordance with an existing wired or wireless communication protocol, the communication unit 160 in one laser distance measurement device, i.e., the device 1A, performs a communication for synchronizing a scan control of a laser beam with that of the communication unit 160 of the other laser distance measurement device, i.e., the device 1B, that the device 1A is arranged to face.

When the distance to a target is measured by using the laser distance measurement device 1 of the present embodiment, a process of obtaining determination information, which was explained by referring to FIG. 4A through FIG. 4C in the first embodiment, is performed as a prior process. Also, the laser distance measurement device 1 of the present embodiment performs the respective processes illustrated in FIG. 5 and FIG. 6 when a process of measuring the distance to the target has started. Note that in a prior process and a process of measuring a distance performed by the laser distance measurement device 1 of the present embodiment, synchronization information is transmitted and received between the communication units 160 of the two laser distance measurement devices 1 and the scan controls of laser beams in the laser distance measurement devices 1 are synchronized. The two laser distance measurement devices 1 (1A and 1B) are synchronized in such a manner for example that the first laser distance measurement devices 1A is treated as the master and the scan of a laser beam of the laser distance measurement device 1B matches the scan of a laser beam in the master.

The laser distance measurement device 1 explained in the above embodiments can be implemented by for example a computer and a program executed by the computer. Hereinafter, by referring to FIG. 10, the laser distance measurement device 1 that is implemented by a computer and a program will be explained.

FIG. 10 illustrates a hardware configuration of a computer.

As illustrated in FIG. 10, a computer 9 includes a processor 901, a main storage device 902, an auxiliary storage device 903, an input device 904, an output device 905, an input/output interface 906, a communication control device 907 and a medium driving device 908. These components 901 through 908 in the computer 9 are connected to each other via a bus 910 so that data can be exchanged between the components.

The processor 901 is a Central Processing Unit (CPU) or a Micro Processing Unit (MPU), etc. The processor 901 controls the overall operations of the computer 9 by executing various types of programs including the operating system. Also, the processor 901 performs for example the respective processes illustrated in the flowcharts in FIG. 5 and FIG. 6. Also, the processor 901 executes for example a program including a prior process of obtaining determination information explained by referring to FIG. 4A through FIG. 4C.

The main storage device 902 includes a read only memory (ROM) and a random access memory (RAM), which are not illustrated. The ROM of the main storage device 902 has recorded in advance for example a prescribed basic control program etc. read by the CPU 901 upon the activation of the computer 9. Also, the RAM of the main storage device 902 is used as a working storage area as needed when the processor 901 executes various types of programs. The RAM of the main storage device 902 can be used as the determination information storage unit 191 and the distance information storage unit 192 in the laser distance measurement device 1 illustrated in FIG. 3 or FIG. 9. Also, the RAM of the main storage device 902 can be used also for storing an emission time, reception time, reception direction, reception intensity, etc. of a laser beam that are obtained in a prior process and a process performed upon measuring a distance.

The auxiliary storage device 903 is a storage device, such as a non-volatile memory including a flash memory (including a Solid State Drive (SSD)), a hard disk drive (HDD) etc., that has a capacity larger than the RAM of the main storage device 902. The auxiliary storage device 903 can be used for storing various types programs executed by the CPU 901, and various types of data etc. The auxiliary storage device 903 can be used for storing for example a distance measurement program including the respective processes illustrated in FIG. 5 and FIG. 6 and storing for example a program etc. including a prior process explained by referring to FIG. 4A through FIG. 4C. Also, the auxiliary storage device 903 can be used for storing for example determination information, an emission time, reception time, reception direction and reception intensity of a laser beam, a calculated distance to a target, etc.

The input device 904 is for example a keyboard device, a touch panel device, etc. In response to a prescribed manipulation performed by the operator (user) of the computer 9, the input device 904 transmits input information associated with the manipulation to the processor 901. The input device 904 can be used for example inputting an instruction to start a prior process or measurement of a distance, an instruction etc. related to other processes that the computer 9 can execute, and various setting values.

The display device 905 is for example a display device such as a liquid crystal display device etc. The output device 905 can be used for example visualizing a result of a prior process (determination information) and a measurement result etc. of the distance to a target so as to provide the visualized information to the operator.

The input/output interface device 906 connects the computer 9 and other electronic devices. The input/output interface 906 includes a connector etc. based on for example a universal serial bus (USB) standard. The input/output interface 906 can be used for connecting for example the computer 9 and the light projection device 11, for connecting the computer 9 and the light reception device 12, and for other purposes. The light projection device 11 is a device that is equivalent to the light projection unit 110 in the laser distance measurement device 1 illustrated in FIG. 3 or FIG. 9 and that emits a laser beam. The light reception device 12 is a device that is equivalent to the light reception unit 120 in the laser distance measurement device 1 illustrated in FIG. 3 or FIG. 9 and that receives a laser beam. Note that the light projection device 11 and the light reception device 12 may be separate devices or may be an integrated device. Also, the input/output interface 906 may be used also for example connecting the computer 9 and the synchronization control device 2.

The communication device 907 connects the computer 9 to a communication network such as the Internet so as to control various types of communications between the computer 9 and other communication devices via the communication network. The communication control device 907 can be used for communications between for example the computer 9 and a server device etc. that collects and manages pieces of distance information calculated by the computer 9. The communication control device 907 can be used for communications between for example the computer 9 and the synchronization control device that is installed in a remote place. Further, the communication control device 907 can be used as for example the communication unit 160 in the laser distance measurement device 1 illustrated in FIG. 9.

The medium driving device 908 reads a program or data recorded in a portable storage medium 10 and writes data etc. stored in the auxiliary storage device 903 to the portable storage medium 10. As the medium driving device 908, for example a reader/writer for a memory card compatible with one or a plurality of standards can be used. When a reader/writer for a memory card is used as the medium driving device 908, a memory card (flash memory) etc. based on for example a standard with which the read/writer is compatible such as a Secure Digital (SD) standard can be used. Also, as the portable storage medium 10, a flash memory including for example a USB standard connector can be used. Further, when the computer 9 includes an optical disk drive that can be used as the medium driving device 908, various types of optical disks that can be recognized by that optical disk drive can be used as the portable storage medium 10. Examples of an optical disk that can be used as the portable storage medium 10 may include a Compact Disc (CD), a Digital Versatile Disc (DVD), a Blu-ray Disc (registered trademark), etc. The portable storage medium 10 can be used for storing a program including a distance measurement program including processes illustrated in FIG. 5 and FIG. 6, a program including a prior process explained by referring to FIG. 4A through FIG. 4C, and other programs. Also, the portable storage medium 10 can be used for storing for example determination information, an emission time, reception time, reception direction and reception intensity of a laser beam and a calculated distance to a target, etc.

When the operator uses the input device 904 etc. to input, to the computer 9, an instruction to start measurement of a distance, the processor 901 reads and executes a distance measurement program stored in a non-transitory recording medium such as the auxiliary storage device 903 etc. the processor 901 executing the distance measurement program functions (operates) as the scan control unit 130, the determination unit 140 and the distance calculation unit 150 in the laser distance measurement device 1 illustrated in FIG. 3 or FIG. 9. Also, the RAM and the auxiliary storage device 903 etc. of the main storage device 902 function as the determination information storage unit 191 and the distance information storage unit 192 in the laser distance measurement device 1 illustrated in FIG. 3 and as a storage unit that stores an emission time, reception time, reception direction, reception intensity, etc. of a laser beam.

Note that the computer 9 that is made to function as the laser distance measurement device 1 does not have to include all the elements 901 through 908 illustrated in FIG. 10, and some of the elements may be omitted in accordance with usage or conditions. For example, the computer 9 may be a device in which the communication control device 907 or medium driving device 908 have been omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A distance measurement device comprising:
a memory configured to store determination information; and
a processor configured to perform a process including:
controlling an emission direction of a first laser beam in a first light projection device that emits the first laser beam and a reception direction of a laser beam in a first light reception device that receives the laser beam;

obtaining an output signal that represents a reception intensity of the laser beam received by the first light reception device;

determining whether or not the laser beam received by the first light reception device is the first laser beam reflected by a target of distance measurement, the determination being determined based on
   a reception direction of the laser beam received by the first light reception device,
   a period of time between when the first light projection device emits the first laser beam and when the first light reception device receives the laser beam,
   a reception intensity of the laser beam received by the first light reception device, and
   the determination information of the memory, the determining information including
   a scope of a reception direction which is obtained before a start of measurement of a distance to the target and in which a second laser beam emitted from a second light projection device can be received in the first light reception device,
   a period of time which is calculated on the basis of a time at which the second light projection device emitted the second laser beam and a time at which the first light reception device received the second laser beam and which is a period of time before the first light reception device receives the second laser beam emitted from the second light projection device, and
   a threshold that is a value between a reception intensity of the laser beam in a case when the laser beam is received with the target not existing in a direction in which the second laser beam is arriving and a reception intensity in a case when the laser beam that was reflected by the target is received, the determination including
   determining that the laser beam received by the first light reception device is the first laser beam reflected by the target when a reception direction of a laser beam received by the first light reception device is within a scope in which the second laser beam can be received and a period of time between when the first light projection device emits the first laser beam and when the first light reception device receives the laser beam and a period of time included in the determination information are different, and
   determining that the laser beam received by the first light reception device is not the first laser beam reflected by the target when a reception direction of the laser beam received by the first light reception device is within a scope in which the second laser beam can be received, a period of time between when the first light projection device emits the first laser beam and when the first light reception device receives the laser beam and a period of time included in the determination information are equal, and a reception intensity of the laser beam received by the first light reception device is equal to or higher than the threshold included in the determination information; and calculating a distance to the target based on the period of time in a case when it is determined that the laser beam received by the first light reception device is the first laser beam reflected by the target.

2. The distance measurement device according to claim 1, wherein
   controlling an emission direction of the first laser beam in the first light projection device and a reception direction of the laser beam in the first light reception device is performed by making a scan in an emission direction and a reception direction of the first laser beam synchronize with a scan in an emission direction of the second laser beam in the second light projection device and a reception direction of a laser beam in the second light reception device that is used in combination with the second light projection device.

3. The distance measurement device according to claim 1, wherein
   the first light projection device can change an emission direction of the first laser beam in two directions that are orthogonal,
   the first light reception device can change a reception direction of the laser beam in two directions that are orthogonal, and
   controlling an emission direction of the first laser beam and a reception direction of the laser beam in the light reception unit includes controlling a scan in an emission direction of the first laser beam and a reception direction of the laser beam in the two directions that are orthogonal.

4. The distance measurement device according to claim 1, wherein
   the first light reception device includes a multi-division light receiving element in which a plurality of light receiving elements are arranged in an array.

5. A distance measurement method comprising:
   controlling, by a computer, an emission direction of a first laser beam in a prescribed light projection device that emits the first laser beam and a reception direction of a laser beam in a prescribed light reception device so as to obtain an output signal representing a reception intensity of a laser beam received from the light reception device;
   determining, by the computer, whether or not the laser beam received by the light reception device is the first laser beam reflected by a target of distance measurement,
   the determination being determined based on
      a reception direction of the laser beam received by the light reception device,
      a period of time between when the light projection device emits a laser beam and when the light reception device receives a laser beam,
      a reception intensity of the laser beam received by the light reception device, and
      determination information that has been generated in advance,
   the determining information including
      a scope of a reception direction which is obtained before a start of measurement of a distance to the target and in which a second laser beam emitted from a second light projection device can be received in the first light reception device,
      a period of time which is calculated on the basis of a time at which the second light projection device emitted the second laser beam and a time at which the first light reception device received the second laser beam and which is a period of time before the first light reception device receives the second laser beam emitted from the second light projection device, and a threshold that is a value between a reception intensity of the laser beam in a case when the laser beam is received with the target not existing in a direction in which the second laser beam is arriving and a reception intensity in a case when the laser beam that was reflected by the target is received, the determination including determining that the laser beam received by the first light reception device is the first laser beam reflected by the target when a reception direction of a laser beam received by the first light reception device is within a scope in which the second laser beam can be received and a period of time between when the first light projection device emits the first laser beam and when the first light reception device receives the laser beam and a period of time included in the determination information are different, and determining that the laser beam received by the first light reception device is not the first laser beam reflected by the target when a reception direction of the laser beam received by the first light reception device is within a scope in which the second laser beam can be received, a period of time between when the first light projection device emits the first laser beam and when the first light reception device receives the laser beam and a period of time included in the determination information are equal, and a reception intensity of the laser beam received by the first light reception device is equal to or higher than the threshold included in the determination information; and calculating a distance to the target based on the period of time in a case when it is determined that the laser beam received by the light reception device is the first laser beam reflected by the target.

\* \* \* \* \*